United States Patent [19]
Roderiguez et al.

[11] Patent Number: 6,071,612
[45] Date of Patent: Jun. 6, 2000

[54] FIBER AND FILAMENT WITH ZINC SULFIDE DELUSTERANT

[75] Inventors: Joseph Anthony Roderiguez, Kings Mountain; Rodolfo Agustin Flores, Shelby; Katherine Keever Fulcomer, Gastonia; J. Michael Sutherland, Shelby, all of N.C.

[73] Assignee: Arteva North America S.a.r.l., Zurich, Switzerland

[21] Appl. No.: 09/425,541

[22] Filed: Oct. 22, 1999

[51] Int. Cl.[7] .................................. D02G 3/00; C08J 3/10
[52] U.S. Cl. ..................... 428/364; 524/413; 524/420; 524/432; 264/176.1; 428/365
[58] Field of Search ...................... 524/413, 420, 524/432; 264/176.1; 428/364, 365

[56] References Cited

U.S. PATENT DOCUMENTS

| | | |
|---|---|---|
| 3,988,108 | 10/1976 | Segoshi et al. . |
| 4,111,905 | 9/1978 | Larkin et al. . |
| 4,211,813 | 7/1980 | Gravisse et al. . |
| 4,331,776 | 5/1982 | Gazonnet . |
| 4,719,066 | 1/1988 | Wells et al. . |
| 4,916,013 | 4/1990 | Maeda et al. ............................ 428/374 |
| 5,240,980 | 8/1993 | Danielson et al. . |
| 5,276,080 | 1/1994 | Oku . |
| 5,321,069 | 6/1994 | Owens . |
| 5,405,905 | 4/1995 | Darr . |
| 5,443,775 | 8/1995 | Brannon . |
| 5,478,878 | 12/1995 | Nagaoka et al. . |
| 5,654,096 | 8/1997 | Yamada et al. . |
| 5,674,437 | 10/1997 | Geisel . |
| 5,690,922 | 11/1997 | Mouri et al. . |
| 5,750,616 | 5/1998 | Shimpuku et al. . |
| 5,898,059 | 4/1999 | Trojan . |

OTHER PUBLICATIONS

Sachtleben Chemie GmbH Article—Technical Data and Recommendation, Date Unknown.

*Primary Examiner*—Samuel A. Acquah
*Attorney, Agent, or Firm*—Gregory N. Clements

[57] ABSTRACT

A process for producing yarn, fiber or filament with substantially improved whiteness, reduced yellowness, reduced abrasiveness, reduced static and softer hand includes melt-blending a masterbatch of zinc sulfide and a polyester with a fiber-forming polyester followed by melt-spinning the blend. The invention additionally provides for polyester yarn, fiber, or filament produced by the process.

27 Claims, No Drawings

FIBER AND FILAMENT WITH ZINC SULFIDE DELUSTERANT

FIELD OF THE INVENTION

The present invention discloses a process to prepare articles such as fiber, filament, yarn and the like, with improved whiteness, reduced discoloration, low static reduced abrasiveness, and improved hand. The inventive process comprises melt-blending a masterbatch comprising zinc sulfide and a fiber-forming terephthalate polymer with the fiber-forming polymer and then melt-spinning the blend to yield the desired product. The improved properties result from controlling both the concentration of zinc sulfide in the masterbatch and the residence time of zinc sulfide in the melt. The articles produced exhibit superior color and surface properties as used herein.

BACKGROUND OF THE INVENTION

Methods to improve or alter the visual and tactile properties of yarn, fibers, filaments and the like are known in the art. Many such methods employ additives such as $TiO_2$ and ZnS. U.S. Pat. No. 5,478,878 discloses a polymer composition comprising a polyphenylene ether, a polyamide and an inorganic filler including zinc sulfide and a photobleachable organic dye or pigment. Known techniques, however, are generally directed to using zinc sulfide as a phosphorescent agent or titanium dioxide as a delusterant. Following is a brief synopsis of known methods of incorporating various additives and fillers to fiber-forming polymers during processing into fibrous products.

U.S. Pat. No. 5,674,437 discloses luminescent fibrous material made from a composition comprising a thermoplastic polymer and a metal aluminate oxide pigment, whereas, U.S. Pat. No. 5,321,069 discloses phosphorescent and fluorescent articles prepared from a composition containing a thermoplastic polymer (e.g. polypropylene), a wetting agent and a phosphorescent agent such as zinc sulfide. The literature also includes the following patents of general interest: U.S. Pat. No. 5,750,616 discloses compositions comprising a thermoplastic resin, a fiber reinforcing material and carbon black; U.S. Pat. No. 4,331,776 discloses polyamide masterbatches made from polyamides and pore-forming agents; U.S. Pat. No. 4,719,066 discloses a method of making flame retardant polyamide fiber from polyamide and polyamide masterbatch comprising zinc, molybdenum and chlorine; U.S. Pat. No. 4,111,905 discloses compositions comprising a thermoplastic resin, zinc sulfide and optional basic compounds to prepare fibers with improved flame retardancy; U.S. Pat. No. 5,240,980 discloses opacifier compositions comprising a thermoplastic resin and zinc sulfide; U.S. Pat. No. 5,405,905 discloses compositions comprising a thermoplastic resin and a non-toxic phosphorescent pigment such as zinc sulfide; U.S. Pat. No. 5,443,775 discloses pigmented compositions comprising a thermoplastic resin and zinc sulfide; U.S. Pat. No. 5,478,878 discloses compositions comprising a filled thermoplastic resin, the filler being zinc sulfide; U.S. Pat. No. 5,674,437 discloses compositions and luminescent articles comprising a thermoplastic resin and zinc sulfide; U.S. Pat. No. 4,211.813 discloses photoluminescent compositions comprising a thermoplastic resin, zinc sulfide and a fluorescent material; U.S. Pat. No. 5,276,080 discloses compositions comprising a thermoplastic resin and semiconductive fillers; U.S. Pat. No. 3,988,108 discloses compositions to prepare colored structures, the compositions comprising a coloring agent and a prepolymer of a synthetic resin; U.S. Pat. No. 5,898,059 discloses a process to prepare polyethylene terephthalate ("PET"); U.S. Pat. No. 5,654,096 discloses electroconductive articles prepared from compositions comprising a thermoplastic resin and an electroconductive filamentary segment; U.S. Pat. No. 5,690,922 discloses deodorizable fibers made from a fiber incorporated with titanium dioxide, a phosphate of a tetravalent metal and a hydroxide of a divalent metal.

Known fiber-forming methods using $TiO_2$ are expensive. Furthermore, such methods lead to abrasive articles since $TiO_2$ is an abrasive material. ZnS, on the other hand, is a softer material; however, it is photocatalytic. The photocatalytic property of ZnS leads to discoloration or yellowing. Therefore, while methods employing ZnS instead of $TiO_2$ to provide properties such as fluorescence and phosphorescence are known, using ZnS as a delusterant to improve the luster and abrasive properties of fibrous articles has not been reported.

There is a perceived need in the industry for fibers, filaments, yarn and like articles which have reduced discoloration, i.e. improved whiteness. Additional benefits of the articles of the present invention include reduced abrasiveness and static, and better hand as described hereinafter.

SUMMARY OF THE INVENTION

The invention generally provides a process for producing articles such as fiber, filament, yarn and the like with reduced abrasiveness and static while at the same time having improved whiteness and feel. It has now been discovered that the whiteness of certain polyester products is substantially enhanced while at the same time its abrasiveness is quite reduced, by the incorporation therein of about 0.1 to 3, preferably up to 2, weight percent zinc sulfide. The zinc sulfide is preferably added to the polymer contained in the melt-spinning apparatus prior to melt-spinning, in the form of a masterbatch of the zinc sulfide in the same polymer and by limiting the residence time of the zinc sulfide/polymer masterbatch in the melt to be under 20 minutes. Alternatively, the masterbatch can be added to a fiber-forming polyester as part of a continuous polymerization process, after the film-forming polyester has exited the last polymerization in the process and prior to the extrusion of the blend into chip. In all instances, it is desirable to minimize the residence time that the masterbatch/polyester melt blend spend in the melt. The concentration of zinc sulfide in the masterbatch is about 1–50 weight percent based on the weight of the masterbatch. The masterbatch is added in sufficient amounts to the polymer in the spinner such that the concentration of the zinc sulfide in the spun yarn is in the range 0.1–3 weight percent as stated above. Such a combination of adding sufficient amounts of zinc sulfide as a masterbatch to the polymer prior to spinning and limiting the residence time of the zinc sulfide in the melt to be under 10 minutes has surprisingly been found to improve the whiteness in the spun yarn while at the same time reducing discoloration, reducing abrasiveness and improving hand.

Useful polymers are fiber-forming polyesters. Examples of suitable polyesters are polyethylene terephthalate ("PET"), polybutylene terephthalate ("PBT"), or polytrimethylene terephthalate ("PTT"). PET is the most preferred polyester.

The present invention also includes polyester yarn, fiber or filament prepared by the process described above as well as articles incorporating such yarn, fiber or filament.

There is provided in one aspect of the present invention, a process for making a melt-spun polyester fibrous product with a zinc sulfide delusterant including melt-blending a masterbatch composition made up of a fiber forming polyester selected from the group consisting of PET, PBT and PTT, and from about 0.1 to 50 wt. percent of zinc sulfide with the fiber-forming polyester followed by melt-spinning the blend. The product exhibits an increased Hunter Color L parameter over a corresponding product containing the same polyester and like levels of $TiO_2$ as a delusterant. As used herein, the term corresponding product refers to one that includes the same polyester and substitutes the same or like percent by weight $TiO_2$ for the ZnS. Moreover, the $TiO_2$ in a corresponding product will generally have the same or similar particle size distribution as the ZnS in the product of the invention, and a corresponding product is of like dimensions and physical properties whether it is a yarn, filament or staple product.

Typically, the residence time of the masterbatch in the melt will be less than about 20 minutes, generally from about 1 to about 20 or about 1 to about 10 minutes being preferred. From about 1 to about 5 minutes residence time in the melt is more preferred, with from about 1 to about 3 minutes residence time of the masterbatch in the melt with the film-forming polymer being particularly preferred.

The melt-blended product typically contains from about 0.2 to about 2.5 wt. percent zinc sulfide (ZnS) and in some embodiments about 2 wt. percent. The masterbatch typically contains from about 2 to about 25 wt. percent ZnS and in some embodiments about 20 percent. The product may be a continuous filament, such as those in partially oriented yarns or a staple fiber. Particularly preferred filament products are continuous filament products of 40–400 denier bundle which may be of 1–5 dpf (denier per filament). Preferred filament products may have a diameter of 0.01–0.05 mm for an individual filament and a thickness of from about 0.4–20 mm for a filament bundle. Preferred staple products (crimped or uncrimped) are generally from about 1½–8 inches in length and about 1–5 dpf.

Fibrous products in accordance with the invention include a fiber-forming polyester selected from the group consisting of PET, PBT and PTT and ZnS as a delusterant. These products exhibit a Hunter Color L parameter o fat least about 85 and a Hunter color b parameter of about 2.5 or less. L parameters of greater than 90 are desirable as are b parameters of 2.0 or less.

Zinc sulfide may be present in any suitable amount, with from about 0.1 to about 2.0 percent by weight of the product being typical. The products according to the invention exhibit a Hunter Color L parameter greater than that of corresponding products which contain only $TiO_2$ as a delusterant. So also, the products of the invention exhibit improved abrasiveness, functional properties, static and hand as will be appreciated from the discussion which follows.

DESCRIPTION OF THE INVENTION

In one embodiment, the present invention provides a process for producing articles such as yarn, fiber, filament and the like with reduced abrasiveness, improved hand and lower static while at the same time having improved whiteness. Such improved properties are achieved in the product by incorporating controlled amounts of ZnS in the product by way of the inventive process. The process comprises first separately preparing a polyester masterbatch containing zinc sulfide, sometimes referred to herein as ZnS and the same polyester from which the yarn is desired. The concentration of ZnS in the masterbatch is about 1–50 weight percent. The virgin polyester that is to be melt spun is supplied to a spinneret apparatus and the masterbatch is then added to the apparatus, minutes prior to the melt-spinning step. The mix is then melt spun to produce the desired fibrous product. By controlling the residence time of the ZnS-containing masterbatch in the melt to be under 20 minutes, yarn containing about 1–3 weight percent of ZnS is produced, with the desired whiteness and other properties described above. The polyester that is used for preparing the masterbatch with ZnS is the same polyester that is spun in the spinneret into the product. The polyester may optionally contain additives such as, for example, light stabilizers, heat stabilizers, additives to reduce static, modifiers for dyeability and the like.

The masterbatch comprises the polymer and ZnS. Zinc sulfide useful in the practice of the invention is available commercially from Sachtleben GmbH (Germany) in the form of powder. If in some other form, the ZnS may be powdered or pulverised by known methods. The polymer and zinc sulfide may be compounded to form an intimate mixture of the masterbatch by any of the well-known methods and machines available. Melt compounding in a suitable device such as an extruder is a preferred method. Minimum processing time at melt temperature and the use of dry ingredients are preferred in order to minimize the possibility of any reaction. The polyester and ZnS along with any other desired additives, pigment, thermal stabilizer and the like, may be fed via a hopper into the extruder, melt-blended and extruded. The extruded material may then be quenched and pelletized. Preferably, the masterbatch is formed as chips or pellets which are suitable to be subsequently added to the base resin in the melt spinner prior to the melt-spinning operation. As stated earlier, the concentration of the ZnS in the masterbatch is generally in the range about 1–50 weight percent, preferably about 15–25 weight percent and typically about 20 weight percent. It is desirable to minimize the exposure of ZnS to the molten polyester during preparation of the masterbatch as well as during manufacture of the fibrous product. Typically, it is desirable to have ZnS in contact with molten polymer for less than about 10 minutes in the melt-spinning apparatus ("melt residence time") and more preferably for form about 1 to about 5 minutes. Less than 3 minutes melt residence time is even more preferred during preparation of the masterbatch.

The following examples are illustrative of the present invention. Parts and percentages are by weight unless otherwise indicated. Hunter color L, a, and b parameters were measured using TAPPI Method T 524 OM-94. The symbols L, a, b designate color values as follows: L denotes lightness increasing from zero for black to 100 for perfect white: a shows redness when plus, greenness when minus, and zero for gray; and b represents yellowness when plus, blueness when minus, and zero for gray.

The present invention is directed generally to fibrous terephthalate products wherein the terephthalate polymer is polyethylene terephthalate (PET), polybutylene terephthalate (PBT) or polytrimethylene terephthalate (PTT) sometimes referred to as polypropylene terephthalate, wherein the product contains a zinc sulfide (ZnS) delusterant. Particularly preferred zinc sulfide delusterants include Sachtolith® products available from Sachtleben Chemie GmbH (German). In the examples which follow, an "L" grade Sachtolith® zinc sulfide powder was used which has a refractive index of about 2.3, a pH of about 7, a particle size (average) of about 0.3 microns, a Moh's hardness of about 3 and a brightness (Ry) of about 95. This powder has a brightness lower than $TiO_2$ powders of similar characteristics, and is recommended for masterbatch processing with synthetic polymers.

Unless otherwise indicated, masterbatches of PET, PBT, PTT and delusterant are prepared in accordance with the following procedure for purposes of the comparative examples ($TiO_2$) and for purposes of making the inventive fibers as further described herein.

After the thermoplastic polymer composition is selected from PET, PBT, PTT or the like, a mixture of the thermoplastic polymer and at least one delusterant (ZnS or $TiO_2$) is prepared under high shear in a high intensity mixer. The delusterant is typically added in quantities sufficient to yield 20–30 percent by weight of the total masterbatch composition. More particularly, the high intensity mixer is one in which the thermoplastic polymer composition is heated to a temperature sufficient to melt the thermoplastic composition whereupon the delusterant is thoroughly mixed into the melted thermoplastic polymer composition under high shear and high intensity conditions. Any mixer capable of providing the desired high shear and high intensity mixing at polymer melt temperatures can be utilized in preparing the mixtures. Specific examples of useful high intensity mixers include extruders, two-roll mills, Banbury mills, etc. Extruders, including single screw and paring the thermoplastic polymer-color pigment mixtures useful in the low profile additives of the present invention.

The high shear energy in the high intensity mixer is accomplished generally by having a surface within the high intensity mixer moving at a high rate of speed with respect to the particles and liquid within the mixer. The high shear energy which is applied to the particles and liquid in the high intensity mixers in accordance with the process of the present invention is sufficient to deagglomerate the solid particles such as pigment particles, but generally there is no significant change in the size of the original primary particle. The high shear energy generally raises the temperature of the mixture. The time of mixing varies and depends on the type of pigment particles, the type of polymer, speed of mixer, ratio of polymer to pigment, etc. Precise times of mixing can be readily determined by one skilled in the art with a minimum of experimentation taking into consideration the above factors.

EXAMPLES 1–3 AND COMPARATIVE EXAMPLES A–C (PARTIALLY ORIENTED YARN)

Masterbatches of PET and either ZnS or $TiO_2$ were prepared as described above. Clear (no delusterant) PET polymer chips of 0.65 IV were melted in a single screw extruder at 280° C. At the end of the extruder (to minimize residence time in the melt), the masterbatch pellets (ZnS or $TiO_2$) were fed to the melt at a rate sufficient to yield the target level of delusterant in the yarn (0.17%, 0.38%, 1.0% by weight). The molten blend was then passed through a 66 hole spinneret, air-quenched at 90° C., coated with a texturing finish and wound onto a tube at 10,000 feet per minute, producing a 150 denier/33 filament partially oriented yarn. Test results for this yarn appear in Table 1. It is noted that the $TiO_2$ of comparative examples A, B and C generally had the same particle size of the ZnS used in Examples 1, 2 and 3 of the invention and slightly higher brightness.

In Table 1, and throughout this patent unless otherwise indicated, the following standards are used:

| | |
|---|---|
| Hunter Color Parameters L, a, b | TAPPI T 524 OM-94 |
| Denier | ASTM D-1907 |
| Tenacity, Breakstrength TE ½, Elongation | ASTM D5035 |
| Shrinkage; BWS, HAS | ASTM D5104 |

Table 1 shows test results for partially oriented yarn characteristics including strength, shrinkage, and color.

TABLE 1

Partially Oriented Yarn Characteristics

| Example | Delusterant | Additive Level | DENIER | TENACITY (g/d) | BREAKSTRENGTH (g) | TE 1/2 | ELONGATION (%) | BWS (%) | HAS (%) | L | a | b |
|---|---|---|---|---|---|---|---|---|---|---|---|---|
| A | Std. TiO2 | 0.17% | 151.67 | 2.61 | 395.86 | 28.58 | 119.93 | 63.11 | 63.46 | 86.59 | −0.38 | 1.81 |
| B | Std. TiO2 | 0.38% | 151.85 | 2.5 | 379.63 | 27.62 | 122.02 | 62.59 | 64.22 | 84.59 | −0.39 | 1.16 |
| C | Std. TiO2 | 1.00% | 152.92 | 2.4 | 367.01 | 26.89 | 125.53 | 65.08 | 64.49 | 82.09 | −0.42 | 1.48 |
| 1 | Zinc Sulfide | 0.17% | 151.75 | 2.63 | 399.10 | 29.41 | 125.06 | 63.09 | 65.48 | 91.4 | −0.55 | 2.25 |
| 2 | Zinc Sulfide | 0.38% | 151.98 | 2.62 | 398.19 | 29.23 | 124.5 | 63.46 | 64.86 | 92.61 | −0.53 | 1.98 |
| 3 | Zinc Sulfide | 1.00% | 152.84 | 2.47 | 377.51 | 27.28 | 122.02 | 63.37 | 65.09 | 93.55 | −0.49 | 1.7 |

It can be seen from Table 1, that while the partially oriented yarn of the present invention generally has properties comparable to yarns with $TiO_2$ delusterant, it was surprisingly found that the yarns of the invention with ZnS delusterant consistently exhibited higher lightness index.

EXAMPLES 4–6 AND COMPARATIVE EXAMPLES D–F

Following the procedures of examples 1–3 and A–C above, textured yarns were prepared at various levels of ZnS and $TiO_2$ delusterant. The continuous filament partially oriented yarns were converted into textured yarns by known processes. The partially oriented yarn was delivered from the supply package by a first feed roll. The yarn then passed through the draw zone which is located between the input feed roll and a second feed roll. Here, the yarn is concurrently drawn, twisted, and heat set on the primary heater (generally 150–230° C.). The twist insertion member, generally has a guide disc and one or more working discs containing aggregate(s) (ceramic or polyurethane) also in the draw zone. Twist insertion extends back to the first feed roll and is set on the primary heater. The set twist comes out of the yarn immediately below the aggregate. The second feed roll, which runs at a higher speed (typically 500–800 mpm) than the first to induce drawing (ratio of 1.0–2.0), then delivers the yarn into the second heating zone (generally 150–230° C.). The third roll, following the second heater, generally operates at a slower speed than the second feed roll so that the yarn may be overfed into the second heating zone to set much of the bulk. Finally, the yarn is wound onto a package which turns at a slightly higher speed than the third roll in order to provide adequate tension in the threadline to produce a well wound package of yarn. The speed of the second shaft is the throughput speed of the machine and all other speeds, draw ratio, D/Y ratio, second over feed, and take-up, are generally calculated in relation to that shaft.

Textured yarn so prepared was tested for abrasiveness by attaching a ten gram weight to one end of the yarn sample which is then threaded through 3 chrome friction pins (0.75" diameter, 5 RMS), across a 0.35 mm diameter steel wire so as to form a 90 degree angle, onto a winder. The yarn sample was then run across the wire at 1000 m/min for one hour. The resulting notch on the wire was measured and reported as width×depth in mm in Table 2. Also reported in Table 2 are frictional forces in grams (ASTM D-3108-89) for various other speeds and running static (standard volt meter readings) at 300 m/minute for Examples 4–6 and comparative Examples D–F.

The KES testers are located where a standard atmosphere laboratory condition (70±2° F., 65±2% RH) is maintained. Prior to testing, the materials are prepared in this environment, thus allowing them to reach a state of equilibrium.

A standard specimen size of 20×20 cm is used in three replications. All measurements are directional, except for compression, and are made in both the warp/lengthwise direction, and in the filling/crosswise direction of the sample. Appropriate instrument settings are used for the material being tested.

Tensile

The tensile test, done on the KES-FB 1 Tensile-Shear Tester, measures the stress/strain parameters at the maximum load of 500 gf/cm for woven materials, 250 gf/cm for knits, and 50 gf/cm for nonwoven materials.

LT—linearity of the load extension curve, 0 to 1 values (1=completely linear, 0—extremely nonlinear)

WT—tensile energy, gf·cm/cm$^2$ (higher WT corresponds to higher extensibility, but must be interpreted in conjunction with LT)

RT—tensile resilience, percent (recovery of deformation from strain)

EMT—extensibility, percent strain at maximum load (100%=complete elasticity, 0%=complete inelasticity)

TABLE 2

High-Speed Fiber-To-Metal Friction and Abrasion

| Example | Delusterant | Loading (wt. %) | Friction Force, g 100 m/min | 200 m/min | 300 m/min | Running Static, V @ 300 m/min | Notch Dimensions width × depth, mm |
|---|---|---|---|---|---|---|---|
| 4 | ZnS | 0.17% | 173 ± 19 | 202 ± 14 | 176 ± 18 | −1335 V | 0.35 × 0.01 |
| 5 | ZnS | 0.38% | 119 ± 12 | 95 ± 9 | 77 ± 5 | −718 V | 0.35 × 0.02 |
| 6 | ZnS | 1.00% | 49 ± 4 | 43 ± 5 | 41 ± 2 | −598 V | 0.37 × 0.04 |
| D | TiO$_2$ | 0.17% | 195 ± 21 | 240 ± 28 | 210 ± 16 | −1581 V | 0.36 × 0.03 |
| E | TiO$_2$ | 0.38% | 146 ± 16 | 170 ± 18 | 168 ± 19 | −1477 V | 0.36 × 0.04 |
| F | TiO$_2$ | 1.00% | 64 ± 8 | 60 ± 8 | 62 ± 5 | −1074 V | 0.36 × 0.14 |

It will be appreciated from Table 2 that the textured yarns of the invention exhibit less fiber to metal abrasiveness than corresponding fibers with a TiO$_2$ delusterant, and generally generate less friction and lower static as well under comparable conditions.

In addition, the fibrous products in accordance with the present invention generally exhibit superior hand than products utilizing only TiO$_2$ as a delusterant as will be appreciated form the discussion which follows.

In textile products, feel or hand is an important attribute. The polyester products with ZnS delusterant in accordance with the invention generally exhibit superior hand than products containing corresponding TiO$_2$ delusterants, that is of similar loadings and particle size in the same terephthalate polymer.

KES Testing

The Kawabata Evaluation System (KES) is used to make objective measurements of hand properties of test samples. The KES instruments measure the mechanical properties that correspond to the fundamental deformation of fabrics and hand manipulation. The five different tests that can be performed using KES and the different mechanical characteristics produced, are described below.

Shearing

In shear testing, opposing parallel forces are applied to the fabric by the KES-FBI Tensile-Shear Tester until a maximum offset angle of 8° is reached. A pretension load of 10 gf/cm is applied to the specimen in shearing. Shearing stiffness is the ease with which fibers slide against each other resulting in soft/pliable to stiff/rigid structures.

G—shear stiffness, gf/cm·degree (higher G value means greater stiffness/resistance to the shearing movement)

2HG—hysteresis of shear force at 0.5 degrees of shear angle, gf/cm.

2HG5—hysteresis of the shear force at 5.0 degree of shear angle, gf/cm.

Bending

Bending, measured with KES-FB2 Bending Tester, is a measure of the force required to bend the fabric approximately 150°.

B—bending rigidity per unit fabric width, gf·cm$^2$/cm (Higher B value indicates greater stiffness/resistance to bending.)

2HB—hysteresis of bending momentum, gf cm/cm, observed in the bending moment-curvature relationship (A larger 2HB value means a greater fabric inelasticity.)

Surface

The surface properties of friction (resistance/drag) and surface contour (roughness) were determined using the KES-FB4 Surface Tester. A tension load of 210 gf/cm is applied to the sample in the standard test.

MIU—coefficient of friction, 0 to 1 value (Higher MIU value corresponds to higher friction)

MMD—mean deviation of MIU (Higher value corresponds to larger variation of friction)

SMD—geometric roughness, micron (Higher SMD corresponds to geometrically rougher surface.)

Compression

Compressional properties of a 2 cm$^2$ area, were measured with the KES-FB3 Compression Tester at 0 to 50 gf/cm$^2$ (10 gf/cm$^2$ for nonwoven materials).

LC—linearity of compression-thickness curve, 0 to 1 values (1=completely linear, 0—extremely nonlinear)

WC—compressional energy, gf·cm/cm$^2$ (A larger WC value corresponds to higher compressibility.)

RC—compressional resilience, percent (A higher RC value means high percent recovery from being compressed, regain of thickness.)

EMC—compressibility at 50 gf/cm$^2$ compared to initial thickness measured at 0.5 gf/cm$^2$, percent (A higher value indicates greater compressibility.)

Thickness—a 2 cm$^2$ area measured at 0.5 gf/cm$^2$ and reported in millimeters (mm).

Weight

Weight is measured according to ASTM D 3776, small swatch option. Three 20×20 cm specimens are weighted on an analytical balance and the weight is calculated in mass per unit area (oz/yd$^2$).

EXAMPLE 7 AND COMPARATIVE EXAMPLE G

Woven fabric samples were prepared from textured yarn produced in accordance with Examples 4–6 and D–F except that a textured yarn was produced with 2% by weight ZnS delusterant in accordance with the invention (Example 7) and with 1.5% TiO$_2$ delusterant (Comparative Example G). 20×20 cm replicate test samples of fabric were evaluated for KES characteristics and the results appear in Table 3.

TABLE 3

Summary of Mechanical and Surface Properties

| Property | Example 7 | | Comparative Example G | |
|---|---|---|---|---|
| | Side A | Side B | Side A | Side B |
| Tensile | | | | |
| LT (-) | 0.72 | | 0.73 | |
| WT (gf.cm/cm$^2$) | 6.10 | | 6.39 | |
| RT (%) | 47.97 | | 51.85 | |
| EMT (%)[1] | 3.40 | | 3.53 | |
| Shearing | | | | |
| G (gf/cm.degree)[2] | 1.93 | | 2.65 | |
| 2 HG (gf/cm) | 7.56 | | 11.09 | |
| 2 HG 5 (gf/cm) | 8.26 | | 11.68 | |
| Bending | | | | |
| B (gf.cm$^2$cm)[3] | 0.30 | | 0.25 | |
| 2 HB (gf.cm/cm) | 0.60 | | 0.44 | |
| Surface | | | | |
| MIU (-) | 0.29 | 0.27 | 0.29 | 0.30 |
| MMD (-) | 0.02 | 0.02 | 0.02 | 0.02 |
| SMD (micron)[4] | 3.11 | 4.38 | 3.55 | 4.03 |
| Compression | | | | |
| LC (-) | 0.36 | | 0.34 | |
| WC (gf/cm/cm)$^2$ | 0.26 | | 0.27 | |
| RC (%) | 36.31 | | 32.59 | |
| EMC (%)[5] | 39.51 | | 40.82 | |
| Thickness (mm) | 0.63 | | 0.88 | |
| Weight (oz./yd$^2$) | 5.82 | | 5.70 | |

[1]Higher EMT value indicates greater extensibility (stretchier).
[2]Lower G value is more shearable (softer/more pliable).
[3]Higher B value indicates greater rigidity.
[4]Higher SMD value indicates a rougher fabric surface.
[5]Higher EMC is more compressible.

It can be seen in Table 3 that the fabric of the present invention exhibited lower KES shear (more softness) as well as a smoother surface, even though the comparative material had less delusterant.

EXAMPLES 8, 9 AND COMPARATIVE EXAMPLES H, I

In still yet other embodiments of the present invention, partially oriented yarn samples were prepared in accordance with Examples 1–3 except that mixed ZnS/TiO$_2$ delusterant was used as indicated in Table 4. As can be seen, the luminance (similar to Hunter L Parameter) increases with the addition of ZnS.

TABLE 4

Partially Oriented Yarn Characteristics

| | Wt % | | | | | | | |
|---|---|---|---|---|---|---|---|---|
| | TiO$_2$ | ZnS | Denier | Tenacity | Elong | BWS | HAS | Luminance |
| Comp H | 0.4 | 0 | 149.75 | 2.26 | 127.98 | 37.64 | 34.10 | 81.6 |
| Ex 8 | 0.4 | 2 | 152.63 | 2.02 | 127.01 | 60.64 | 61.41 | 83.7 |
| Comp I | 0.17 | 0 | 149.77 | 2.30 | 125.70 | 50.28 | 48.78 | 81.3 |
| Ex 9 | 0.17 | 2 | 152.12 | 1.97 | 125.87 | 62.50 | 65.55 | 84.2 |

While the invention has been described in numerous embodiments and aspects thereof, modifications to specific examples set forth above within the spirit and scope of the present invention will be readily apparent to those of skill in the art. The invention is defined in the appended claims.

What is claimed is:

1. A process for making a melt-spun polyester fibrous product with a zinc sulfide delusterant comprising the steps of:

melt-blending a masterbatch composition comprising a fiber-forming polyester selected from the group consisting of polyethylene terephthalate, polybutylene terephthalate and polytrimethylene terephthalate, and from about 1 to about 50 percent by weight of zinc sulfide with said fiber-forming polyester to form a melt-blended composition comprising from about 0.1 to about 3 percent by weight zinc sulfide; and melt-spinning said melt-blended composition into said product, wherein the said product exhibits an increased Hunter Color L parameter as opposed to a corresponding product containing said polyester and $TiO_2$ as a delusterant.

2. The process according to claim 1, wherein the residence time of said masterbatch in the melt is less than about 20 minutes.

3. The process according to claim 1, wherein the residence time of said masterbatch composition in the melt is from about 1 to about 20 minutes.

4. The process according to claim 3, wherein the residence time of said masterbatch composition in the molten state is from about 1 to about 10 minutes.

5. The process according to claim 4, wherein the residence time of said masterbatch composition in the molten state is from about 1 to about 5 minutes.

6. The process according to claim 5, wherein the residence time of said masterbatch composition in the molten state is from about 1 to about 3 minutes.

7. The process according to claim 1, wherein said melt-blended composition comprises from about 0.2 to about 2.5 percent by weight zinc sulfide.

8. The process according to claim 7, wherein said melt-blended composition comprises about 2 percent by weight zinc sulfide.

9. The process according to claim 1, wherein said masterbatch composition comprises from about 2 to about 25 percent by weight zinc sulfide.

10. The process according to claim 9, wherein said masterbatch comprises about 20 percent by weight zinc sulfide.

11. The process according to claim 1, wherein said fibrous product comprises a filament product having a diameter of from about 0.01 to about 0.05 mm.

12. The process according to claim 1, wherein said fibrous product comprises a staple fiber product of from about 1 to about 5 dpf.

13. The process according to claim 1, wherein said polyester comprises polyethylene terephthalate.

14. The process according to claim 1, wherein said polyester comprises polybutylene terephthalate.

15. The process according to claim 1, wherein said polyester is polytrimethylene terephthalate.

16. A polyester fibrous product comprising a polyester selected from the group consisting of polyethylene terephthalate, polybutylene terephthalate and polytrimethylene terephthalate and a zinc sulfide delusterant in an amount of from about 0.1 to about 3 percent by weight exhibiting a Hunter Color L parameter of at least about 85 and a Hunter Color b parameter of 2.5 or less.

17. The polyester product according to claim 16, wherein said product has a Hunter Color L parameter of at least about 90.

18. The polyester product according to claim 16, wherein said product has a Hunter color b parameter of 2.0 or less.

19. The polyester product of claim 16, wherein said polyester is polyethylene terephthalate.

20. The polyester product of claim 16, wherein said polyester is polybutylene terephthalate.

21. The polyester product according to claim 16, wherein said polyester is trimethylene terephthalate.

22. The polyester product according to claim 19, wherein zinc sulfide is present in said product in an amount of from about 0.1 to about 2 percent by weight.

23. A polyester fibrous product containing a zinc sulfide delusterant, wherein said polyester is selected from the group consisting of polyethylene terephthalate, polybutylene terephthalate and polytrimethylene terephthalate and wherein said product exhibits a Hunter Color L parameter greater than that of a corresponding product containing $TiO_2$ as a delusterant.

24. The product according to claim 23, wherein fabrics made from said product exhibit more softness as characterized by lower KES shear values than corresponding KES parameters of a fabric made from a corresponding polyester product containing like levels of $TiO_2$ as a delusterant.

25. A polyester fibrous product containing a zinc sulfide delusterant, wherein said polyester is selected from the group consisting of polyethylene terephthalate, polybutylene terephthalate and polytrimethylene terephthalate and wherein said product exhibits reduced abrasiveness as compared with a corresponding product containing like levels of $TiO_2$ as a delusterant.

26. The product according to claim 25, wherein said product exhibits reduced friction as compared with a corresponding product containing like levels of a $TiO_2$ delusterant.

27. The product according to claim 25, wherein said product exhibits lower static as compared with a corresponding product containing like levels of $TiO_2$ as a delusterant.

* * * * *